Patented Jan. 9, 1934

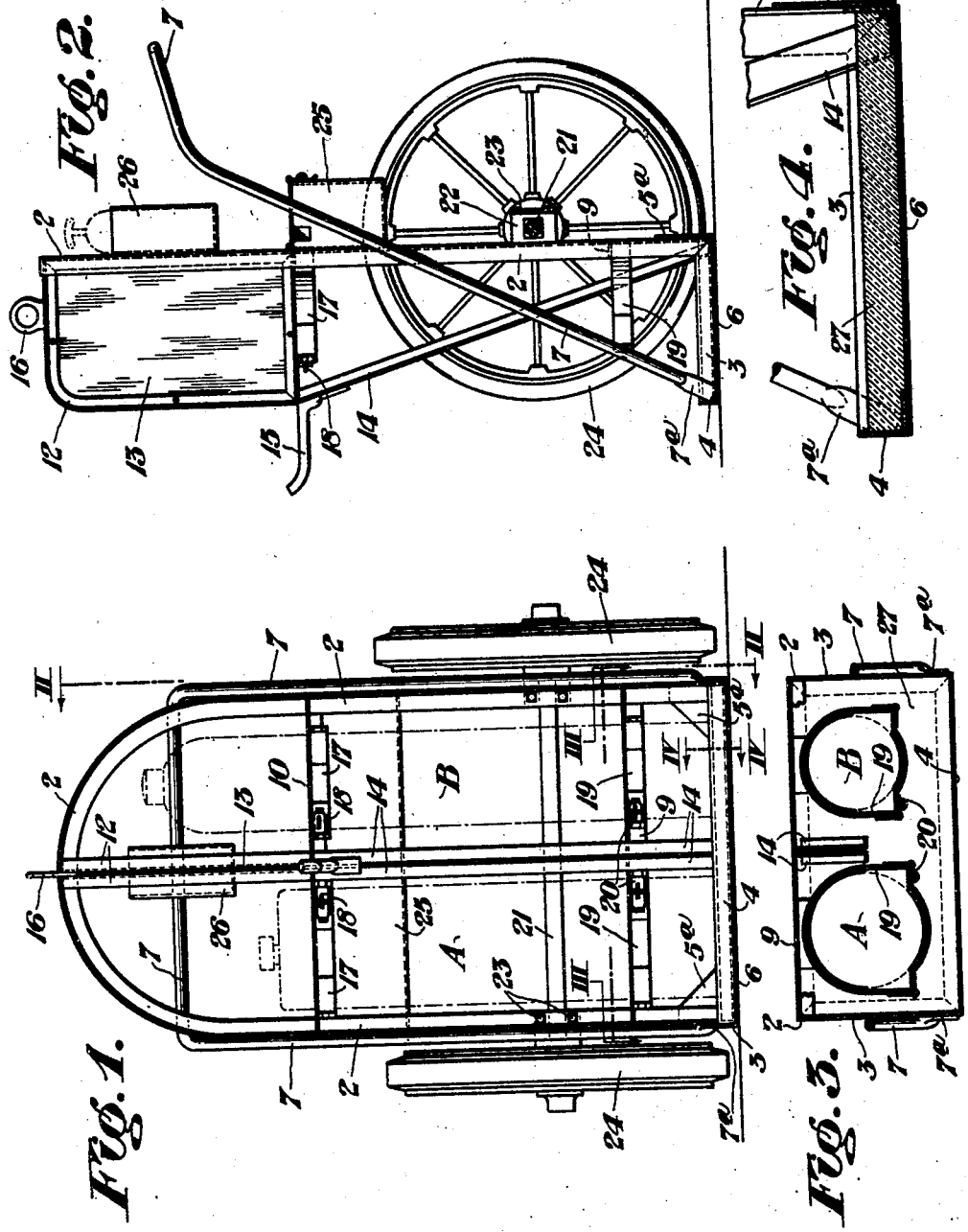

1,942,562

UNITED STATES PATENT OFFICE 1,942,562

TRUCK

Charles W. Meyers, Cleveland Heights, Ohio

Application December 27, 1932
Serial No. 649,043

3 Claims. (Cl. 280—53)

This invention relates to improvements in trucks, and more particularly to hand trucks used for trundling portable apparatus, such as welding, cutting or burning equipment.

One object of the invention is the provision of a novel truck which is cheap and easy to manufacture and one which will be very durable in service.

Another object is to provide a device which is highly efficient in use, reducing to a minimum the usual danger attending the transportation and use of welding, cutting or burning equipment.

These and other objects will be apparent after referring to the drawing, in which:

Figure 1 is a side elevation of the apparatus of the invention.

Figure 2 is an end elevation of the apparatus of Figure 1.

Figure 3 is a plan view taken on the line III—III of Figure 1.

Figure 4 is a fragmentary sectional detail taken on the line IV—IV of Figure 1.

Referring more particularly to the drawing, the numeral 2 indicates a vertical and curved one-piece metallic frame. A pair of angle irons 3 is welded at right angles to each of the ends of the frame 2, and a similar angle iron 4 is welded to the ends of these angle irons 3.

An angle iron 5 is welded across the bottom of the frame 2, and a plate 6 is welded to the bottom surfaces of all of the angle irons, forming a tray. Triangular plates 5ª are welded to the backs of the angle iron 5 and frame 2 to lend rigidity to the structure.

A curved handle 7 is welded to the side and intermediate portions of the frame 2 and is provided with an extension 7ª which is welded to the sides of the angle irons 3 adjacent their union with the front angle iron 4. Lower and upper transverse braces 9 and 10, respectively, are welded to either side of the frame 2.

A pair of substantially rectangular partition frames 12 is welded to the uppermost portion of the frame 2 and to the transverse brace 10 in right-angular relationship to the frame 2 for supporting a fire-shield partition 13. A pair of supports 14 is provided for the partition frames 12 and is welded to the outside ends thereof and to the angle iron 5 at the bottom of the frame 2.

A hose-supporting hook 15 is welded to the supports 14 adjacent their joints with the partition frames 12 and a hook-eye 16 is secured to the uppermost portion of the frames 12, to provide for transporting the truck, as by a crane, to places inaccessible to rolling equipment. A pair of clamps 17 having latches 18 is welded to the transverse brace 10 and on either side of the partition frames 12. A pair of clamps 19 having latches 20 is positioned beneath the clamps 17 and adjacent the tray.

An axle 21 having bearing housings 22, which are secured to the frame 2 by means of nuts and bolts 23, is provided with suitable antifriction bearings 22ª and rubber tired wheels 24, which are arranged with their peripheries above the bottom portion of the tray. A tool box 25 is welded to the transverse brace 10 and frame 2 for carrying necessary tools, and a fire extinguisher support 26 is welded to the inside ends of the partition frames 12.

A resilient pad 27 is disposed in the tray formed by the angle irons 3, 4 and 5, together with the plate 6, and serves as a cushion for tanks A and B containing acetylene and oxygen, respectively, in order to absorb shocks and prevent derangement of sensitive regulators on the tanks, which are maintained in rigid vertical position by means of the clamps 17 and 19.

While I have shown and described one specific embodiment of my invention it will be understood that I do not wish to be limited exactly thereto, since various modifications may be made without departing from the scope of my invention, as defined in the following claims.

I claim:

1. A truck for welding equipment comprising a vertical frame, a tray secured to said frame, a handle secured to said frame and having extensions for supporting said tray, wheels secured to said frame with their peripheries above the bottom portion of said tray, a partition for the upper portion of said frame, a support for said partition, braces for said frame, resilient media disposed in said tray, and means associated with said braces for supporting objects resting upon said resilient media.

2. A truck for welding equipment comprising a vertical frame, a tray welded to said frame, a handle welded to said frame and having extensions welded to said tray, wheels secured to said frame with their peripheries above the bottom portion of said tray, braces welded to said frame, a partition frame for the upper portion of said vertical frame, a fire shield partition associated with said partition frame, a support for said partition frame, resilient media disposed in said tray and means associated with said braces for supporting welding equipment resting upon said resilient media.

3. A trundle truck comprising a vertical frame having upper and lower transversely bracing members, a tray attached to said frame, a handle attached to said frame and having extensions which are attached to said tray, wheels secured to said frame with their peripheries above the bottom portion of said tray, a partition frame connected to the upper of said transverse bracing members and to said vertical frame, a partition associated with said partition frame, a support for said partition frame, said support being connected to the lower of said transverse bracing members, resilient media disposed in said tray and means associated with both of said transverse braces for supporting objects adapted to be carried by said tray.

CHARLES W. MEYERS.